No. 758,191. PATENTED APR. 26, 1904.
W. ROBERTSON.
COALING STATION.
APPLICATION FILED JULY 26, 1902.
NO MODEL. 6 SHEETS—SHEET 1.

No. 758,191. PATENTED APR. 26, 1904.
W. ROBERTSON.
COALING STATION.
APPLICATION FILED JULY 26, 1902.
NO MODEL. 6 SHEETS—SHEET 2.

No. 758,191. PATENTED APR. 26, 1904.
W. ROBERTSON.
COALING STATION.
APPLICATION FILED JULY 26, 1902.
NO MODEL. 6 SHEETS—SHEET 4.

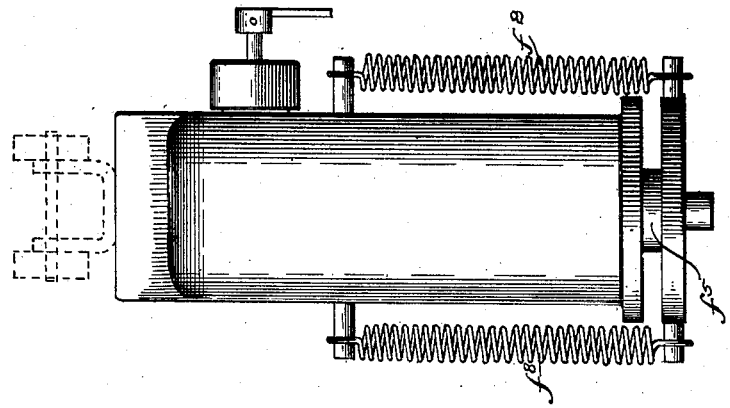
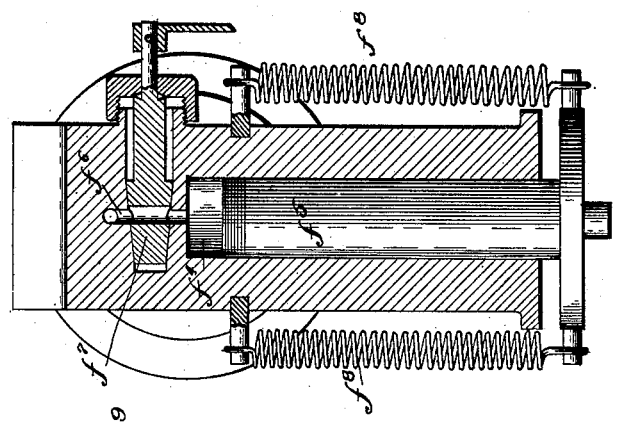
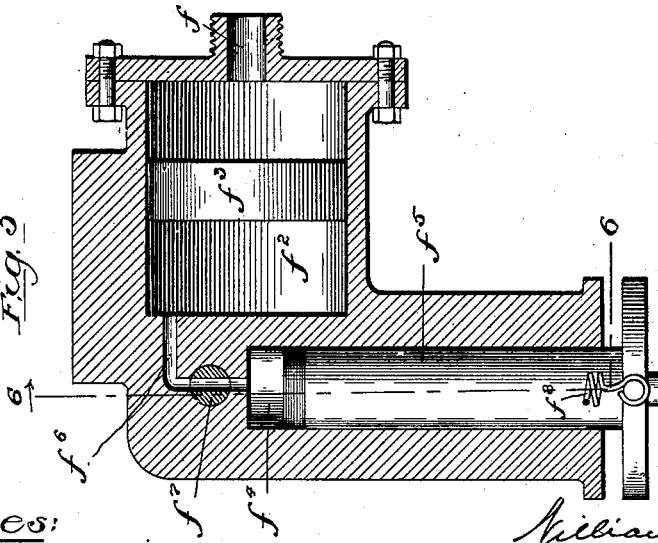

No. 758,191. PATENTED APR. 26, 1904.
W. ROBERTSON.
COALING STATION.
APPLICATION FILED JULY 26, 1902.
NO MODEL. 6 SHEETS—SHEET 6.
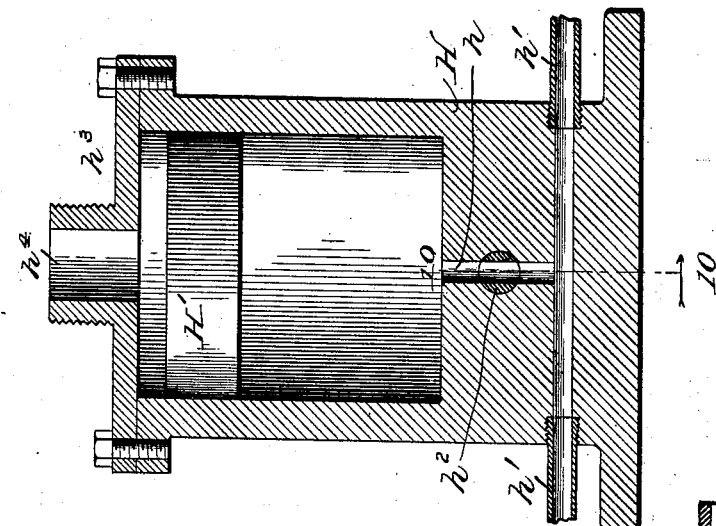
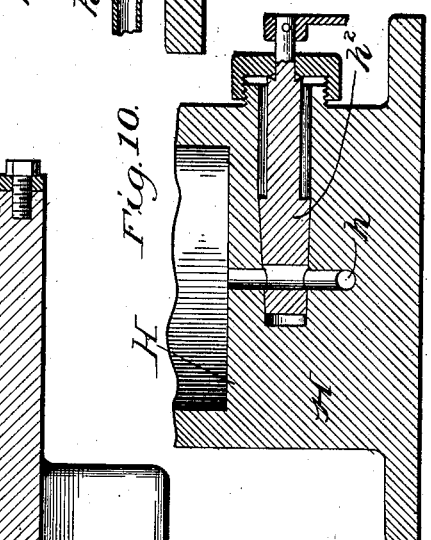
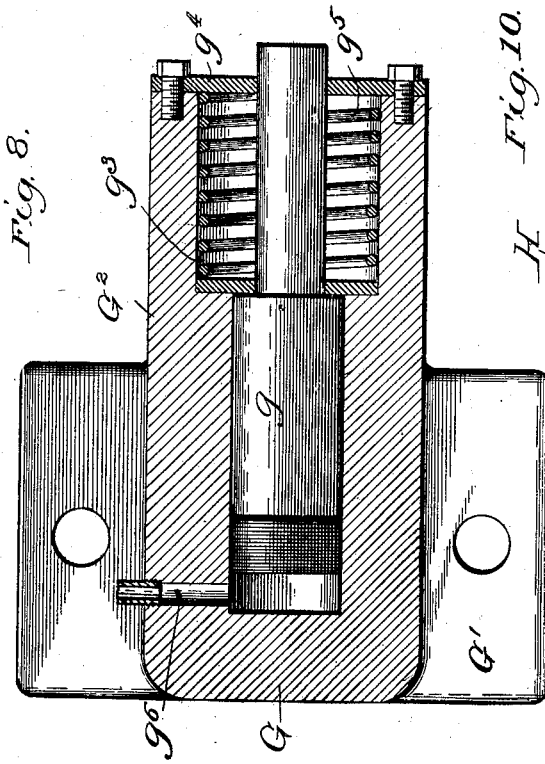
Witnesses:
Inventor
William Robertson
By Charles W. Kee
Attorney No. 758,191. Patented April 26, 1904.

UNITED STATES PATENT OFFICE.

WILLIAM ROBERTSON, OF CHICAGO, ILLINOIS.

COALING-STATION.

SPECIFICATION forming part of Letters Patent No. 758,191, dated April 26, 1904.

Application filed July 26, 1902. Serial No. 117,083. (No model.)

*To all whom it may concern:*

Be it known that I, WILLIAM ROBERTSON, a subject of the King of Great Britain, and a resident of the city of Chicago, in the county of Cook and State of Illinois, have invented certain new and useful Improvements in Coaling-Stations or the Like; and I do hereby declare that the following is a full, clear, and exact description thereof, reference being had to the accompanying drawings, and to the letters of reference marked thereon, which form a part of this specification.

This invention relates to improvements in coaling-stations or the like.

Heretofore many different tipples for unloading cars have been devised, many of which have been slow and uncertain in operation and some of which have been dangerous and unsatisfactory. In many of the constructions heretofore used much time has been lost securing the car from derailment while dumping.

The object of this invention is to provide a simple positively-acting mechanism of great strength and durability adapted to admit of the car being rigidly clamped therein upon its track with the least expenditure of time and so constructed as to dump the contents of the car into a receiving bin or pocket, from which the material may be moved to points of discharge.

The invention embraces many novel features; and it consists in the matters hereinafter described, and more fully pointed out and defined in the appended claims.

Figure 1:
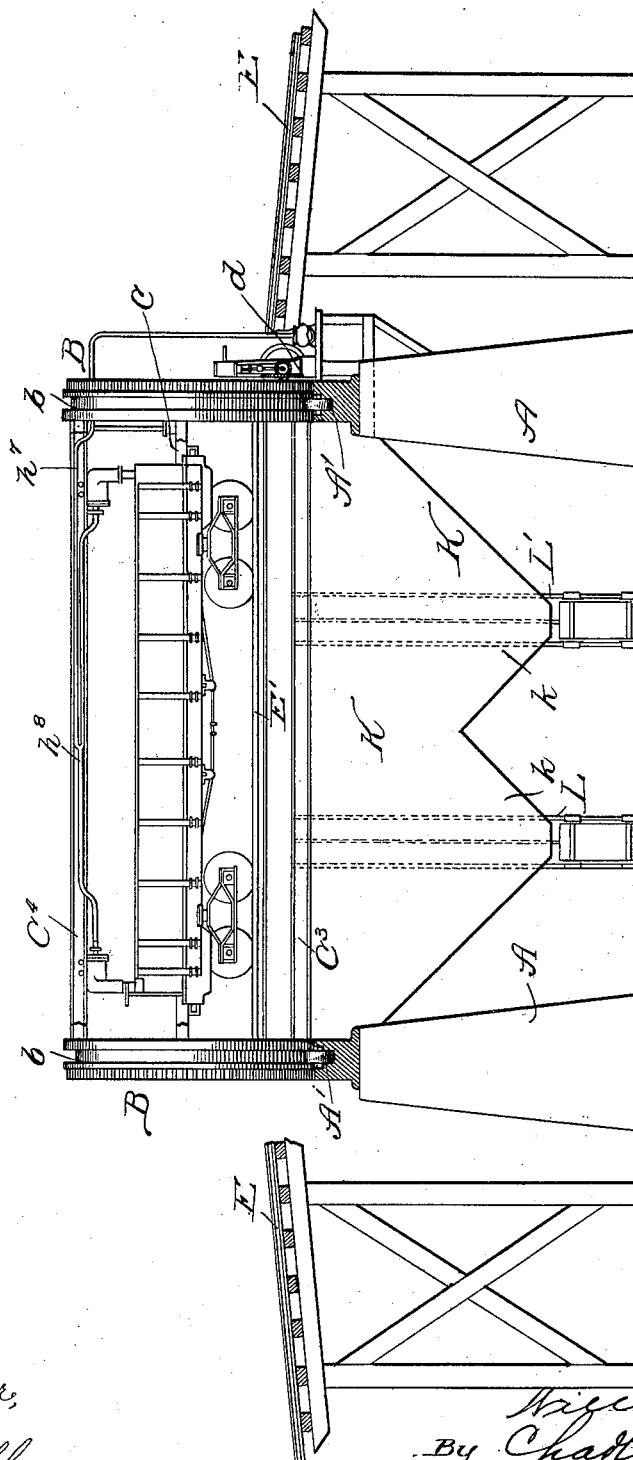
Figure 2:
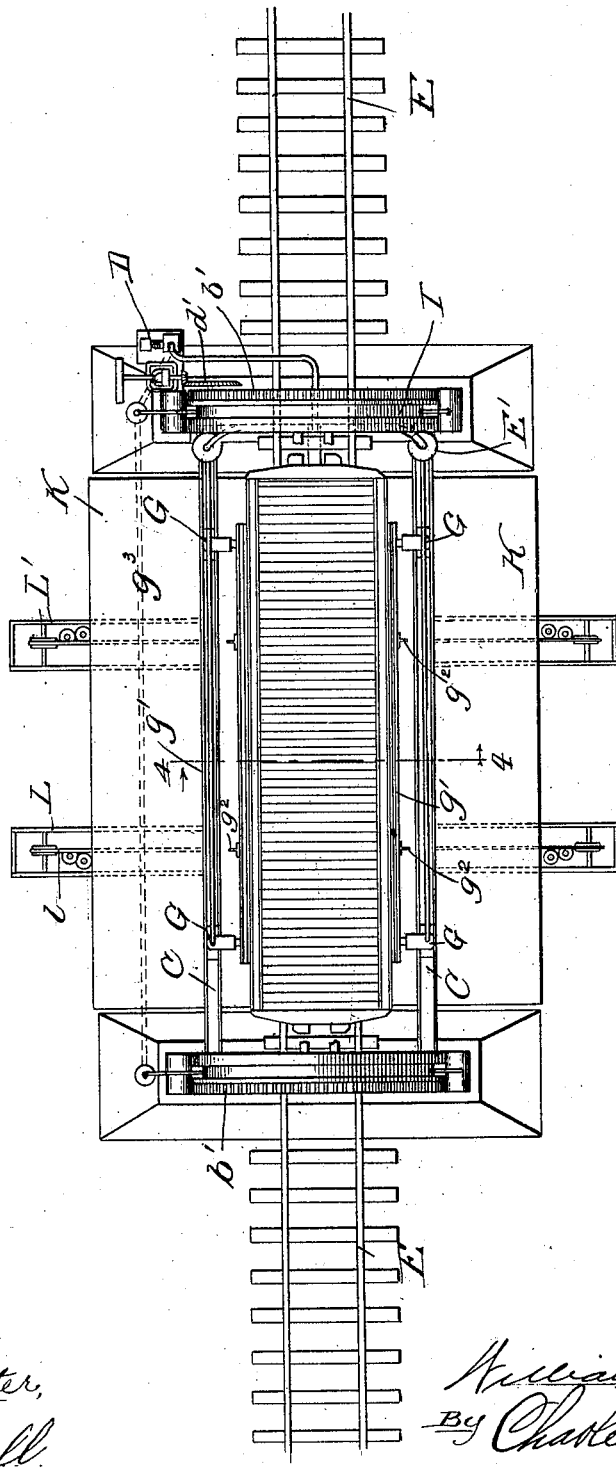
Figure 3:
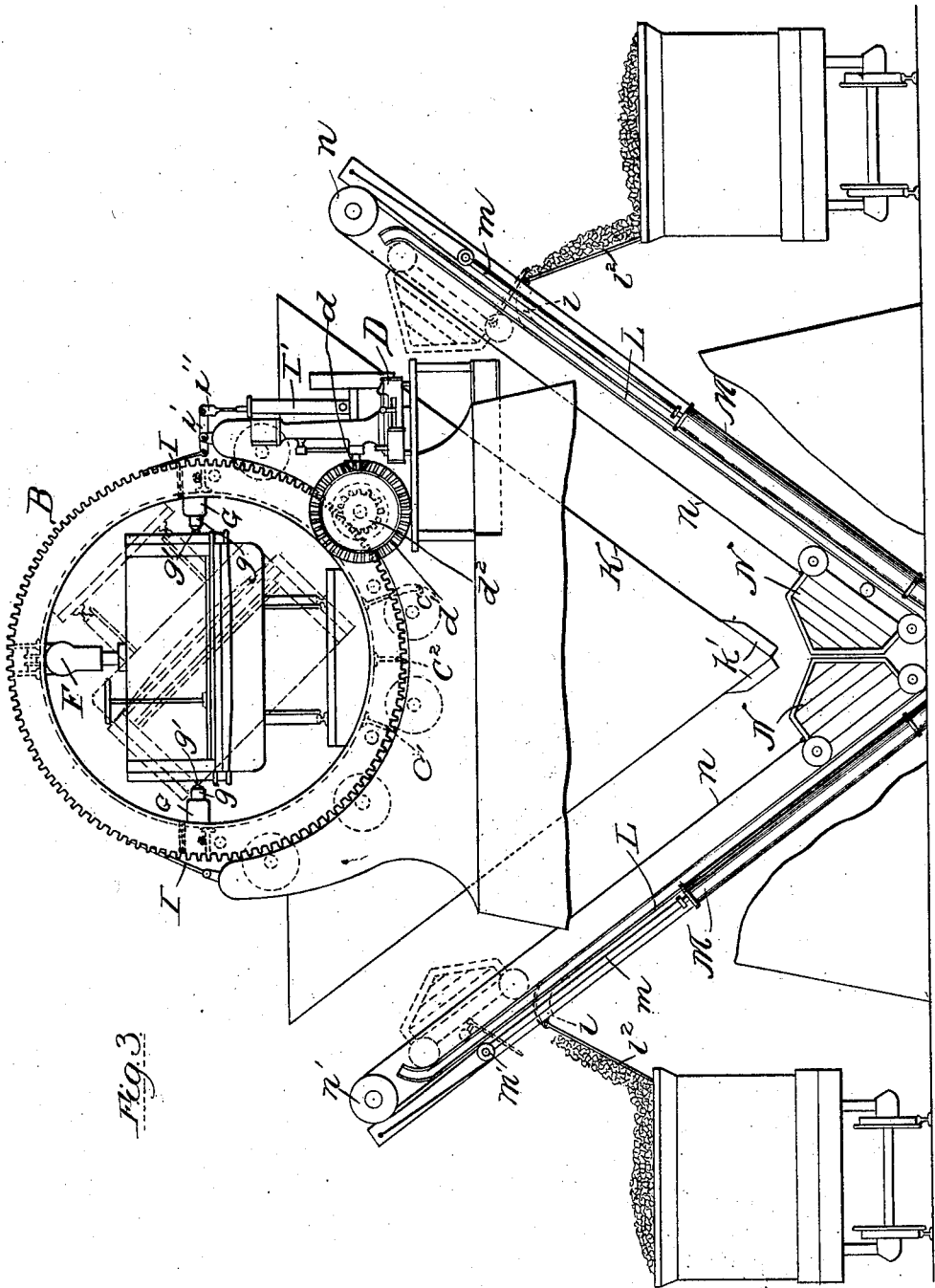
Figure 4:
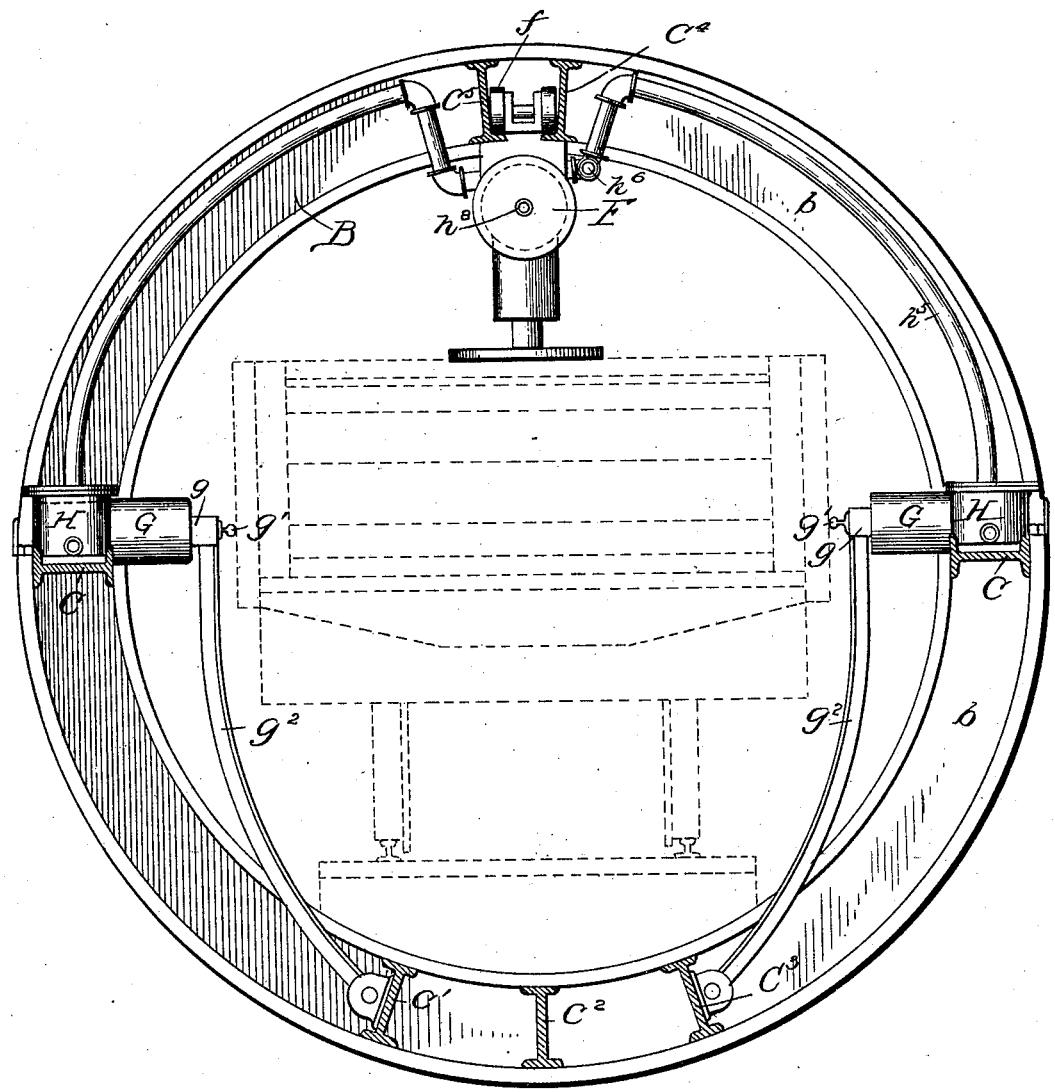

In the drawings, Figure 1 is a side elevation, partly in section, of a device embodying my invention. Fig. 2 is a top plan view, partly broken away, of the same. Fig. 3 is a fragmentary end elevation of the same, showing the elevators in operation, illustrating the operation of the dumping means in dotted lines. Fig. 4 is an enlarged section taken on line 4 4 of Fig. 2 and illustrating the hydraulic and air connections. Fig. 5 is an enlarged vertical longitudinal section of one of the upper hydraulic jacks designed to lock the car to the track. Fig. 6 is a section taken on line 6 6 of Fig. 5 and showing the ram in elevation. Fig. 7 is an end elevation of the same. Fig. 8 is a horizontal section of one of the side locks. Fig. 9 is a vertical section of the pneumatic and hydraulic cylinder which operates the jacks. Fig. 10 is a fragmentary section taken on line 10 10 of Fig. 9.

As shown in said drawings, the tipple and elevating means are illustrated embodied in a coaling-station, though obviously useful for other purposes. Piers A A are provided of any desired height, upon each of which is rigidly bolted or otherwise secured a pedestal or saddle A'. Said saddles, as shown, comprise massive castings having a semicircular seat in the top thereof and having a plurality of rollers (indicated in dotted lines in Fig. 3) journaled transversely therein. Fitting closely in the tops of said saddles or pedestals and supported on the rollers are the annular end frame members, (indicated as a whole by B,) which comprise the bearing-ring $b$, adapted to track on said rollers, and the gear $b'$, rigidly secured on the outer side of said ring by bolting or, if preferred, integrally. Said end frame members B are rigidly connected by I-beams, which are rigidly secured at their ends to the inner side of each of said rings $b$ and serve to rigidly connect said rings, forming a rigid cylindric cage having an interior diameter sufficient to receive a loaded car therein. Said I-beams are disposed one at each side of the cage, (indicated by C C.) Three I-beams $C'$, $C^2$, and $C^3$ are secured at the lower part of said rings beneath the track, and two I-beams $C^4$ and $C^5$ are connected at the top of said rings, as shown in Fig. 4. A motor or engine D of any desired type is supported upon one of the piers, and one end of its driving-shaft is provided with a beveled pinion, which meshes with a beveled gear $d'$, which in turn drives a pinion $d^2$, meshing with the gear-wheel $b'$ and acting to rotate the cage. Obviously, if preferred, driving means may be provided at each end of the cage which may be driven from the same source of power. Inclined tracks E E are provided at each end of the cage, and within the cage a track $E'$ is constructed which registers with the ends of said inclined track-section when the cage is in position to receive the car. Pneumatic and hydraulic means are provided for rigidly locking the car in position upon the track when in said cage, comprising pneumatically-operated hydraulic jacks so disposed above and at the sides of the car as to almost instantaneously engage and firmly hold said car. As shown, one of said jacks (indicated by F) is provided above each end of the car on trucks $f$, which track on the inwardly-directed lower flanges of the I-beams $C^4$ and $C^5$, which serve as a track for said jacks, thereby permitting the same to be adjusted longitudinally of the cage to adapt the same for engaging the ends of cars of various lengths. Rigidly secured on the I-beams C C near each end of the cage are the jacks G, two of which are provided on each side of the car and which, as shown, project horizontally inward. The rams $g$ of the jacks G on each side of the car are rigidly connected together by means of the T-rail $g'$, which is of a length to extend but slightly less than the length of the car and which by the action of said jacks are rigidly jammed into engagement with the car, as shown in Figs. 2 and 4. As shown, T-bars $g^2$ are pivotally attached on the outer side of the I-beams $C'$ and $C^3$, respectively, and extend upwardly and outwardly and are rigidly bolted or riveted to the T-rails $g'$ intermediate of the jacks G. Referring now to the construction of said jacks, the upper jacks (indicated as a whole by F) comprise each a relatively large cylinder $f^2$, having a close-fitting piston $f^3$ therein, free to move longitudinally of the cylinder. Extending downwardly at a right angle with the cylinder $f^2$ is the cylinder $f^4$, having the cylindric close-fitting ram $f^5$ therein. A port $f^6$ connects the inner ends of said cylinders, and a plug-valve $f^7$, provided with an external lever for operating the same, is fitted in said port in position to open and close communication between said cylinders. As shown, strong pulling springs $f^8$ engage on the outer end of the ram, are secured to the cylinder $f^4$, and act to retract the ram within its cylinder when the pressure is released. An inlet-port $f^9$, communicating with the outer end of the cylinder $f^2$, affords connection with a tank or source of compressed-air supply. The jacks G comprise the broad base portion $G'$, which is rigidly secured by riveting, bolting, or like means to the web of one of the I-beams C, and the horizontal inwardly-directed cylinders $G^2$, in which a ram $g$ fits closely. The ends of each ram near its extremity are reduced in size, and the bore of each cylinder $G^2$ near its outer end is increased in diameter, and a follower-plate $g^3$, through which the reduced end of the ram extends, fits closely in the enlarged bore of the cylinder $G^2$. An outer head or plate $g^4$ is rigidly secured on the outer end of said cylinder and apertured to receive the end of the ram therethrough, and a strong coiled spring $g^5$ is secured around the end of the ram in said enlarged bore and presses against the plate $g^3$ and acts to force the ram inwardly.

A port $g^6$ communicates with the inner end of the cylinder $G^2$ and affords connection with the pressure-cylinder H, one of which, as shown, is rigidly secured upon the upper sides of each of the I-beams C, near the end thereof. Said pressure-cylinder is connected through the port $h$ with the ports $g^6$ of said jacks by means of pipes $h'$, which, as shown, have threaded engagement in said ports and lie along the webs of said I-beams. A plug-valve $h^2$, provided with external means for operating the same, is provided in said port $h$ and acts to open or close the same, as desired, by the operator. A close-fitting piston-head $H'$ is provided in the pressure-cylinder and movable longitudinally thereof, and a head $h^3$, provided with an inlet-port $h^4$, is rigidly bolted on the end of the cylinder, affording a tight joint therewith. As shown in Fig. 4, a metallic pipe $h^5$ is connected at its ends in the inlet-ports $h^4$ of said pressure-cylinders and extends upwardly in close proximity with the end frame member and beneath the I-beams $C^4$ and $C^5$ and is connected through a pipe $h^6$ with any source of compressed-air supply. For this purpose a pressure-tank, air-pump, or the like may conveniently be located adjacent to the motor or source of power. The inlet-port $f^9$ of the jack $F'$ is also connected with said pipe $h^5$ through the metallic pipes $h^7$, which extend along the I-beam $C^4$, and is connected with the hose-pipe $h^8$, which communicates at its ends with said inlet-ports of the jacks F, thus permitting the jacks F to be moved longitudinally of the cage to any desired point to adapt the same to the length of the car to be operated upon.

Any desired controlling-valve may be secured in the connection with the source of air-supply to permit air under pressure to be admitted into the outer ends of the cylinders H and the jacks F above the piston-heads $H'$ and $f^3$, respectively, acting to force said pistons inwardly. The inner ends of the pressure-cylinder H and cylinders $f^2$ are filled with oil or other practically incompressible fluid, which also fills the ports and connections between the jacks G and the pressure-cylinder H, so that when the air under pressure is admitted into the outer ends of said cylinders through the inlet-ports the pistons move inwardly, forcing the oil or other liquid into the ram-cylinders and forcing said rams outwardly into positive engagement with the car and rigidly locking the same from movement. The plug-valves $f^7$ and $h^2$ are now closed, preventing the escape of the liquid from the ram-cylinders and enabling said rams to withstand practically any pressure. If power be now applied from the motor to the cage, causing the same to revolve, the car, rigidly locked to the tracks by the jacks, is rotated to the position shown in dotted lines in Fig. 3, permitting the contents to be dumped therefrom.

As shown, a brake is provided which acts to control the speed of rotation of the cage or to hold the same at any desired point in its rotation. Said brake comprises a broad strap of metal I, pivotally connected with the saddle on the side opposite the motor D and extending over the annular frame member in engagement with the periphery thereof, which is grooved to receive the same. The other end of said strap is engaged on one end of the lever $i$, pivoted on said saddle adjacent to the motor. The other end of said lever is pivotally connected with a piston-rod $i'$ of a pneumatic or a steam cylinder I', as shown in Figs. 2 and 3, whereby any desired strain may be produced on said brake-straps I, causing the same to frictionally engage the annular frame member. As shown, a brake is provided at each end of the cage, the pressure-cylinders $i'$ for which may both be connected with the same source of pressure-supply and operated with a single valve, if desired.

As shown, a storage bin or pocket K is provided beneath the cage in position to receive the contents of the car when dumped. Said pocket may be of any desired size or capacity and of any desired shape. In Figs. 1 and 3, however, in which the device is shown installed between parallel railway-tracks, the bottom of said bin or pocket forms a hopper intermediate of the tracks. As shown, two of said hoppers (indicated by $k$) are provided at the bottom of said pocket or bin and arranged longitudinally of the track, as shown in Fig. 1, and are provided with laterally-directed chutes $k'$ at their lower ends. Inclining laterally upward from beneath said hoppers are the oppositely-disposed tracks, (indicated by L L'.) Intermediate between the track-rails of each of said tracks is a track-rail $l$, the upper end of which is curved downwardly, as shown in Fig. 3. Pneumatic or steam cylinders M are provided in close relation with said track, as shown, being supported in the frame for the track and beneath the track-rails and provided in the usual manner each with a reciprocating piston, the piston-rod of which is indicated by $m$. A car N is provided on each of said tracks, which are shaped at their rear end to fit together, as shown in Fig. 3, when both of the cars are in filling position. Said cars each have a part of the front end and top of the car open to receive coal or other material from the bin. The bottoms of said cars, as shown, are hinged to the car-body and provided with small trucks, which run on the intermediate rails $l$, so that when the car is elevated to a point above the downwardly-inclined end of said intermediate rail the bottom falls away from the car and permits the contents to dump therefrom. A cable $n$ is attached at one end of the car and led through sheaves $n'$ at the outer end of the track and to a sheave $m'$ at the end of the piston-rod and the other end secured to the end of the track-frame, as shown in Fig. 3, so that when air is admitted to the cylinder and the piston forced inwardly of the cylinder the car is drawn to the extremity of the track to dumping position. Chute-boards $l^2$ are hinged to the track below the dumping-point of the car and serve to direct the material to the point of delivery—in this instance the tender of a locomotive. Obviously any desired number of such laterally-directed tracks may be provided.

The operation is as follows: With the cage in the position indicated in Fig. 1 the car is moved up the inclined track and secured in the cage by means of the jacks, which operate almost instantaneously to lock the car in the cage. When the rams are firmly engaged upon the car, the plug-valves are turned to prevent the escape of the liquid from the ram-cylinders. Obviously with the valve closed the jacks are capable of withstanding any pressure less than that required to burst the cylinder. Power is now applied to the cage, partly rotating the same to the position indicated in dotted lines in Fig. 3, dumping the material therefrom into the pocket or bin. The cage is then returned to its normal position, with the track therein registering with the inclined tracks, and the jacks are released from the car by shutting off the air-pressure from the outer ends of the pressure-cylinders and opening the valves between the pressure-cylinders and the ram-cylinders. The springs act to retract the rams; but obviously the T-rails and T-bars pivoted on the I-beams C' and C³ and which incline laterally and outwardly aid to retract the rams into the jacks G by gravity, so that the oil or liquid in the ram-cylinders is quickly forced into the pressure-cylinders, and the rams fall away from the car, which may now be pushed from the cage and another introduced therein.

When it is desired to coal an engine, the engine is stationed with its tender opposite one of the elevators, and one of the chutes $k'$ is opened, permitting material to fall therefrom into the car until the same is filled. Compressed air or steam may then be admitted into the cylinder M, forcing the piston inwardly and elevating the car to the position shown in dotted lines in Fig. 3 and permitting its contents to dump down the chute-board into the tender. If preferred, the chute-boards may be operatively connected with the elevator-car in such a manner that the return of the car down the track elevates the chute-board. Obviously, if preferred, two or more engines may be coaled at the same time without inconvenience or delay. Said elevator-cars may be constructed in any manner to provide a bottom or side dump. Obviously from the construction described the cars may be very rapidly unloaded in the manner described, and many details of construction, both of the cage, the means for operating the same, and the elevators, may be varied without departing from the principles of this invention.

I claim as my invention—

1. In a device of the class described a car-tipple comprising annular end frame members, upper and lower and laterally-disposed beams connecting the same, fluid-operated jacks secured on the lateral beams and longitudinally-movable fluid-operated jacks carried on the upper beams, said jacks acting to positively lock the car in said tipple and means for rotating the tipple.

2. The combination with pedestals, of a cage comprising annular end frame members journaled therein, beams connecting said end frame members and disposed oppositely from each other, fluid-operated jacks secured on said beams above and laterally of the cage and acting to simultaneously and positively engage a car supported therein.

3. In a device of the class described, a cage comprising in combination annular end frame members bottom and top beams connecting the same, a track supported in the cage, jacks movable longitudinally thereof on the upper beams, lateral jacks acting with said movable jacks to positively lock a car on the track and bunkers below said cage adapted to receive the material from a car on the track.

4. The combination with a track-section, of upper and lateral members on each side thereof rigid with respect to the track-section, fluid-actuated jacks on said upper members and said lateral members acting to positively engage and lock the car on the track-section.

5. In a device of the class described the combination with a cylindric cage, of a longitudinal track-section therein, fluid-operated jacks adjustably secured above the track, similar jacks rigidly secured laterally of the track, pneumatic connections between all of said jacks and means for simultaneously actuating all of said jacks inwardly of the cage into positive holding engagement with a car on the track and means for rotating the cage with a car therein.

6. A cage of the class described comprising annular end frame members, longitudinal I-beams connecting said frame members, both at the bottom and top thereof and at each side of the same, pivotally-supported longitudinal T-rails therein and means for rotating the cage.

7. A cage of the class described comprising annular end members having a geared periphery, means for rotating the cage, longitudinal beams in the top of said cage forming a track, a truck movable therein, a hydraulic jack carried on said truck, a car-track in the lower portion of said cage, a pivotally-supported bar on each side thereof and lateral jacks adapted to engage the same and together with said upper jack lock a car in the cage.

8. The combination with a cylindric cage, of a track extending longitudinally of the cage and adapted to support a loaded car therein, fluid-operated jacks positioned in the cage to engage the car laterally and fluid-operated jacks movably supported in the top of the cage and adapted to engage the car from above and to rigidly hold the same upon its track, and pipes provided with controlling-valves connecting said jacks together and adapting the same to operate from a single source of pressure-supply, and means for rotating the cage with the car therein.

9. A cage of the class described comprising annular end members having a geared periphery, longitudinal I-beams rigidly securing said annular members together, two of said I-beams being located close together at the top of the cage, the lower flanges thereof forming a track, a truck at each end of the cage movable on said flanges, a depending hydraulic jack secured on each of said trucks and adjustable longitudinally of the cage thereby, a source of pressure-supply, and a pipe leading from said source to a point intermediate of said jacks and connected with each of said jacks with flexible connections.

10. The combination with a rotative cylindric cage, of a track-section therein adapted to support a car within the cage, fluid-operated means for engaging the car upon the track and laterally-disposed rails extending longitudinally of the car when in position on the track and pivotally supported at a point beneath the car, and hydraulic jacks rigidly secured on the sides of the cage and acting to force said rails into positive engagement with the car sides.

11. The combination with a rotative cage having a track-section therein adapted to support a car or the like, of adjustable fluid-operated jacks supported at the top of the cage and adapted to positively engage the top of the car, similar jacks rigidly secured at the sides of the cage, a rigid bar on each side of the cage connecting all the jacks on said side, an inwardly-curved bar rigidly secured thereon and pivoted below the car, a source of pressure-supply and pneumatic connections leading therefrom to said jacks and adapting the same to be simultaneously operated, and a valve in each jack adapted to be closed when the jacks are in engagement with the car and to remain closed until released by the operator.

12. The combination with supporting-pedestals, of rollers secured thereon, a rotative cage journaled on said rollers and adapted to receive therein a loaded car or the like, means for simultaneously engaging the car laterally and from above thereby locking the car on the track, a movable truck in the top of said cage, means for rotating the cage, and one or more bunkers or pockets located beneath the cage and conveyers leading from said pockets.

13. In a coaling-station, supporting-pedestals, rollers journaled thereon, a rotative cage journaled on said rollers and adapted to receive and rigidly hold therein a loaded car or the like, a motor acting to rotate the cage with the car, a pneumatically-operated friction-brake for said cage, bunkers or pockets adapted to receive the material from the car when dumped and pneumatically-operated conveyers adapted to receive material from said pockets and deliver the same at predetermined points.

14. The combination in a coaling-station with a rotative cage, of a track-section therein adapted to support a loaded car within the cage, means for rigidly holding the car on said track-section, a motor acting to rotate the cage, pneumatically-operated brakes acting to control the rotation of the cage, a pocket below the cage having a hopper-bottom and one or more elevating-conveyers adapted to receive material from said pockets and to deliver the same laterally of the cage.

15. In a coaling-station, a rotative cage, a track-section therein adapted to support a loaded car within the cage to rotate therewith, pneumatically-operated means acting to secure the car upon the track, means for rotating the cage with the car therein, a pocket beneath the cage to receive the material from the car, and conveyers movable from beneath the pocket and adapted to deliver the material therefrom.

16. In a coaling-station the combination with supporting-pedestals, of a cylindric cage journaled thereon, inclined track-sections leading upwardly to said cage, a track-section within and rigidly secured to the cage and registering with said inclined section when the cage is in receiving position, means for rotating the cage with the car, pneumatically-operated hydraulic jacks disposed within the cage in position to rigidly lock the car to the cage during the rotation thereof, a pocket or bin beneath the cage and into which the contents of the car is dumped by the rotation of the cage, and conveyers adapted to receive material from said pocket.

17. In a coaling-station, supporting-pedestals, a rotative cage journaled thereon and adapted to receive and rigidly hold therein and rotate therewith a loaded car, dumping the contents therefrom, a bin or pocket beneath the cage adapted to receive the material from the car and elevating-conveyers adapted to receive materials from said bin or pocket and deliver the same automatically at a point disposed laterally of the car.

18. In a coaling-station the combination with a car-tipple of the class described and the receiving bin or pocket therefor, of tracks on each side of the bin-pocket, upwardly and laterally inclined tracks extending from beneath said pockets to points above said first-named tracks, a third rail intermediate of the inclined track-rails and having a downturned end at its upper extremity, elevator cars or cages on said tracks, a hinged wall on each of said tracks, a truck on said hinged wall adapted to run on said third or intermediate rail, pneumatically-operated means for moving said conveyer-cars along the track to the upper extremity thereof at which point the hinged wall swings open and an apron or chute-board secured below said inclined track at the point where the car is dumped and adapted to direct material from said cars to the receiving means on the first-named track.

In testimony whereof I have hereunto subscribed my name in the presence of two subscribing witnesses.

WILLIAM ROBERTSON.

Witnesses:
   C. W. HILLS,
   J. H. GLENDENING.